(12) United States Patent
Kamijo et al.

(10) Patent No.: US 10,968,962 B2
(45) Date of Patent: Apr. 6, 2021

(54) CONTROL APPARATUS FOR VEHICLE DRIVE-FORCE TRANSMITTING APPARATUS

(71) Applicant: TOYOTA JIDOSHA KABUSHIKI KAISHA, Toyota (JP)

(72) Inventors: Satoshi Kamijo, Toyota (JP); Makoto Sawada, Nisshin (JP); Kenji Matsuo, Toyota (JP); Kyohei Suzumura, Nagoya (JP); Yoshisuke Kametani, Nagoya (JP); Michio Yoshida, Nagoya (JP); Hiroki Takeda, Okazaki (JP); Takashi Seo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/374,773

(22) Filed: Apr. 4, 2019

(65) Prior Publication Data
US 2019/0309805 A1   Oct. 10, 2019

(30) Foreign Application Priority Data

Apr. 4, 2018   (JP) .............................. JP2018-072727

(51) Int. Cl.
  *F16D 23/06*   (2006.01)
(52) U.S. Cl.
  CPC .... *F16D 23/06* (2013.01); *F16D 2500/10456* (2013.01); *F16D 2500/30415* (2013.01); *F16D 2500/30426* (2013.01); *F16D 2500/50293* (2013.01); *F16D 2500/5104* (2013.01);
  (Continued)

(58) Field of Classification Search
  CPC ........... F16D 23/06; F16D 2500/10456; F16D 2500/30415; F16D 2500/30426; F16D 2500/50293; F16D 2500/5104; F16D 2500/5114; F16D 2500/70424
  See application file for complete search history.

(56) References Cited

U.S. PATENT DOCUMENTS

| 6,058,792 | A  | * | 5/2000 | Kosik ................... F16D 48/066 |
|           |    |   |        | 74/335 |
| 9,057,440 | B2 | * | 6/2015 | Hanai ...................... F16H 57/01 |
| 10,052,948| B2 | * | 8/2018 | Richards ................ B60K 17/35 |

(Continued)

FOREIGN PATENT DOCUMENTS

| JP | 2002-071005 A | 3/2002 |
| JP | 2014-009702 A | 1/2014 |

*Primary Examiner* — David R Morris
(74) *Attorney, Agent, or Firm* — Oliff PLC

(57) ABSTRACT

A control apparatus for a vehicle drive-force transmitting apparatus including a dog clutch that is operated by an actuator to selectively connect and disconnect a drive-force transmitting path. In process of switching of the dog clutch from released state to engaged state, the control apparatus determines whether a rotational speed difference of the dog clutch is equal to or larger than a given difference value when a sleeve of the dog clutch is positioned on an engaging side of a synchronizing position for placing the dog clutch into the engaged state, and stops the switching of the dog clutch to the engaged state and causes the actuator to place the dog clutch back into the released state, when determining that the rotational speed difference is equal to or larger than the given difference value with the sleeve being positioned on the engaging side of the synchronizing position.

11 Claims, 7 Drawing Sheets

(52) U.S. Cl.
CPC .............. *F16D 2500/5114* (2013.01); *F16D 2500/70424* (2013.01)

(56) References Cited

U.S. PATENT DOCUMENTS

| | | | |
|---|---|---|---|
| 10,065,648 B2* | 9/2018 | Matsuo | F16H 61/662 |
| 2002/0023511 A1 | 2/2002 | Miyazaki et al. | |
| 2014/0005903 A1 | 1/2014 | Hanai et al. | |
| 2016/0052522 A1* | 2/2016 | Matsuo | B60W 10/02 74/664 |
| 2016/0297299 A1* | 10/2016 | Richards | B60K 23/08 |
| 2017/0138469 A1* | 5/2017 | Gillella | F16H 61/28 |
| 2019/0322171 A1* | 10/2019 | Yuasa | B60K 23/0808 |

\* cited by examiner

CONTROL APPARATUS FOR VEHICLE DRIVE-FORCE TRANSMITTING APPARATUS

This application claims priority from Japanese Patent Application No. 2018-072727 filed on Apr. 4, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus includes a dog clutch which is provided with a synchromesh mechanism and which is to be operated by an actuator to selectively connect and disconnect a drive-force transmitting path between a drive force source and drive wheels of the vehicle.

BACKGROUND OF THE INVENTION

There is known a control apparatus for a drive-force transmitting apparatus that is to be provided in a vehicle, wherein the drive-force transmitting apparatus includes a dog clutch which is provided with a synchromesh mechanism and which is to be operated by an actuator to selectively connect and disconnect a drive-force transmitting path between a drive force source and drive wheels of the vehicle. A control apparatus for a synchronous engagement device disclosed in JP-2014-9702A is an example of this type of control apparatus. The Japanese Patent Application Publication discloses the control apparatus for an automatic transmission which includes the synchronous engagement device in the form of a dog clutch with a synchromesh mechanism and which is capable of establishing a selected one of a plurality of gear positions that is selectable by switching of the dog clutch between its engaged state and released state, wherein the control apparatus is configured, upon switching of the dog clutch from the released state to the engaged state for executing a shifting action, to determine that a gear noise is likely to be generated if a rotational speed difference between an actual input-shaft rotational speed and a post-shifting input-shaft rotational speed (i.e., input-shaft rotational speed after execution of the shifting action) of the dog clutch is larger than a threshold value when a sleeve reaches a synchronization-completion position, namely, when it is to be determined that a synchronization of the input-side rotational speed and output-side rotational speed of the dog clutch is completed. The control apparatus calculates a damage determination index that is dependent on the rotational speed difference, and inhibits establishment of one or ones of the gear positions which require engagement of the dog clutch or recommends replacement of damaged component or components of the dog clutch or other devices, in a case where an integrated value of the damage determination index exceeds a threshold value. The control apparatus stores therein a control routine executed for making the above-described inhibition and recommendation, and data required for the execution of the control routine.

SUMMARY OF THE INVENTION

By the way, in an arrangement as disclosed in the above-identified Japanese Patent Application Publication, although the engagement of the dog clutch is controlled in a different manner after the determination of possible generation of the gear noise, the dog clutch is placed into the engaged state at least one time together with the possible generation of the gear noise. In this case, if a duration or degree of the generation of the gear noise is long or large, there is a risk that a durability of the dog clutch would be considerably reduced. It is desirable that the generation of the gear noise during process of engagement of the dog clutch is avoided or reduced.

The present invention was made in view of the background art described above. It is therefore an object of the present invention to provide a control apparatus for a vehicle drive-force transmitting apparatus, which is capable of avoiding or reducing generation of a gear noise (that may be referred also to as teeth noise) during process of engagement of a dog clutch.

The object indicated above is achieved according to the following aspects of the present invention.

According to a first aspect of the invention, there is provided a control apparatus for a drive-force transmitting apparatus that is to be provided in a vehicle having a drive force source and drive wheels, wherein the drive-force transmitting apparatus includes a dog clutch which is provided with a synchromesh mechanism and which is to be operated by an actuator to selectively connect and disconnect a drive-force transmitting path between the drive force source and the drive wheels, wherein the dog clutch includes a sleeve that is to be moved by the actuator so as to switch an operation state of the dog clutch between an engaged state in which the drive-force transmitting path is connected and a released state in which the drive-force transmitting path is disconnected, such that a rotational speed difference between an input-side rotational speed and an output-side rotational speed of the dog clutch is to be zeroed when the sleeve is positioned in a synchronizing position in process of switching of the dog clutch from the released state to the engaged state, wherein the control apparatus comprises a failure determining portion configured, in the process of the switching of the dog clutch from the released state to the engaged state, to determine whether the rotational speed difference is equal to or larger than a given difference value when the sleeve is positioned on an engaging side of the synchronizing position for placing the dog clutch into the engaged state, and wherein the control apparatus comprises a clutch control portion configured, upon execution of control for operating the actuator for the switching of the dog clutch from the released state to the engaged state, to stop the switching of the dog clutch from the released state to the engaged state and to cause the actuator to place the dog clutch back into the released state, when the failure determining portion determines that the rotational speed difference is equal to or larger than the given difference value with the sleeve being positioned on the engaging side of the synchronizing position. The failure determining portion may be configured, when determining that the rotational speed difference is equal to or larger than the given difference value with the sleeve being positioned on the engaging side of the synchronizing position in the process of the switching of the dog clutch from the released state to the engaged state, to determine that there is a possibility that a gear noise occurs in the dog clutch, and the clutch control portion may be configured, upon execution of the control for operating the actuator for the switching of the dog clutch from the released state to the engaged state, to stop the switching of the dog clutch from the released state to the engaged state and to cause the actuator to place the dog clutch back into the released state, when the failure determining portion determines that there is the possibility that the gear noise occurs in the dog clutch. Further, the dog clutch may further include an input-side rotary member that is to be rotated at the input-side rotational speed and an output-side rotary member that is to be rotated at the output-side rotational speed, wherein the sleeve is fitted with one of the input-side rotary member and the output-side rotary member, such that the sleeve is unrotatable and movable in an axial direction of the one of the input-side rotary member and the output-side rotary member, relative to the one of the input-side rotary member and the output-side rotary member, and wherein the sleeve has spline teeth which are provided in an circumferential surface of the sleeve, and which are to be brought into meshing engagements with spline teeth provided in a circumferential surface of the other of the input-side rotary member and the output-side rotary member by movement of the sleeve in a direction away from a releasing side of the synchronizing position that is opposite to the engaging side of the synchronizing position in the axial direction in the process of the switching of the dog clutch from the released state to the engaged state. Still further, the dog clutch may further include an annular member which is substantially coaxial with the other of the input-side rotary member and the output-side rotary member and which is rotatable together with the sleeve, wherein the annular member has a tapered circumferential surface that is to be fitted with a tapered circumferential surface of the other of the input-side rotary member and the output-side rotary member, and wherein, in the process of the switching of the dog clutch from the released state to the engaged state, the annular member is to be pressed against the other of the input-side rotary member and the output-side rotary member by the movement of the sleeve in the direction away from the releasing side of the synchronizing position, for thereby causing the rotational speed difference to be reduced by a friction generated between the tapered circumferential surface of the annular member and the tapered circumferential surface of the other of the input-side rotary member and the output-side rotary member.

According to a second aspect of the invention, in the control apparatus according to the first aspect of the invention, the failure determining portion is configured to determine whether the sleeve is positioned on the engaging side of the synchronizing position, depending on whether the sleeve is positioned to be distant from the synchronizing position by at least a given distance value on the engaging side of the synchronizing position, before the rotational speed difference becomes zero.

According to a third aspect of the invention, in the control apparatus according to the second aspect of the invention, the failure determining portion is configured to determine whether the sleeve is positioned to be distant from the synchronizing position by at least the given distance value on the engaging side of the synchronizing position, depending on whether a state in which the sleeve is positioned to be distant from the synchronizing position by at least the given distance value on the engaging side of the synchronizing position, continues for at least a given length of time.

According to a fourth aspect of the invention, in the control apparatus according to any one of the first through third aspects of the invention, the failure determining portion is configured to determine whether the rotational speed difference is equal to or larger than the given difference value, depending on whether the rotational speed difference becomes equal to or larger than the given difference value after the rotational speed difference temporarily becomes zero.

According to a fifth aspect of the invention, in the control apparatus according to the fourth aspect of the invention, the failure determining portion is configured to determine whether the rotational speed difference is equal to or larger than the given difference value, depending on whether the rotational speed difference is equal to or larger than a first given difference value or depending on whether a state in which the rotational speed difference is equal to or larger than a second given difference value that is smaller than the first given difference value, continues for at least a given length of time.

According to a sixth aspect of the invention, in the control apparatus according to any one of the first through fifth aspect of the invention, the drive-force transmitting apparatus further includes: an input rotary member to which the drive force is to be transmitted from the drive force source; an output rotary member from which the drive force is to be outputted to the drive wheels; a gear mechanism configured to provide at least one gear ratio; a continuously-variable transmission mechanism including a primary pulley, a secondary pulley and a transfer element looped over the primary and secondary pulleys; and first and second frictional engagement devices, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path that corresponds to the drive-force transmitting path, such that the drive force is transmitted by the gear mechanism through the first drive-force transmitting path when the first drive-force transmitting path is established by engagements of the first frictional engagement device and the dog clutch, and wherein the plurality of drive-force transmitting paths include a second drive-force transmitting path, such that the drive force is transmitted by the continuously-variable transmission mechanism through the second drive-force transmitting path when the second drive-force transmitting path is established by engagement of the second frictional engagement device.

In the control apparatus according to the first aspect of the invention, during control for switching of the dog clutch from the released state to the engaged state, when it is determined that the rotational speed difference is equal to or larger than the given difference value with the sleeve being positioned on the engaging side of the synchronizing position, the switching of the dog clutch from the released state to the engaged state is stopped and the actuator is operated to place the dog clutch back into the released state. Thus, the control for switching of the dog clutch to the engaged state can be avoided from being proceeded in a state with concern of generation of a gear noise. It is therefore possible to avoid or reduce generation of the gear noise during process of engagement of the dog clutch. A reduction of durability of each part of the dog clutch can be avoided or restrained by thus avoiding or reducing the generation of the gear noise.

In the control apparatus according to the second aspect of the invention, it is determined whether the sleeve is positioned on the engaging side of the synchronizing position, depending on whether the sleeve is positioned to be distant from the synchronizing position by at least a given distance value on the engaging side of the synchronizing position, before the rotational speed difference becomes zero, so that it is possible to appropriately determine whether there is a possibility that the gear noise occurs in the dog clutch. That is, during the control for switching of the dog clutch to the engaged state, the state with concern of generation of the gear noise can be appropriately grasped. Thus, the control for switching of the dog clutch to the engaged state can be appropriately avoided from being proceeded in the state with concern of generation of a gear noise.

In the control apparatus according to the third aspect of the invention, it is determined whether the sleeve is positioned to be distant from the synchronizing position by at least the given distance value on the engaging side of the synchronizing position, depending on whether the state in which the sleeve is positioned to be distant from the synchronizing position by at least the given distance value on the engaging side of the synchronizing position, continues for at least the given length of time. Thus, it is possible to more appropriately determine whether there is a possibility that the gear noise occurs in the dog clutch.

In the control apparatus according to the fourth aspect of the invention, it is determined whether the rotational speed difference is equal to or larger than the given difference value, depending on whether the rotational speed difference becomes equal to or larger than the given difference value after the rotational speed difference temporarily becomes zero. Thus, it is possible to appropriately determine whether there is a possibility that the gear noise occurs in the dog clutch. That is, during the control for switching of the dog clutch to the engaged state, the state with concern of generation of the gear noise can be appropriately grasped. Thus, the control for switching of the dog clutch to the engaged state can be appropriately avoided from being proceeded in the state with concern of generation of a gear noise.

In the control apparatus according to the fifth aspect of the invention, it is determined whether the rotational speed difference is equal to or larger than the given difference value, depending on whether the rotational speed difference is equal to or larger than the first given difference value or depending whether the state in which the rotational speed difference is equal to or larger than the second given difference value that is smaller than the first given difference value, continues for at least the given length of time. Thus, it is possible to more appropriately determine whether there is a possibility that the gear noise occurs in the dog clutch.

In the control apparatus according to the sixth aspect of the invention, the generation of the gear noise during process of engagement of the dog clutch can be avoided or reduced in the drive-force transmitting apparatus defining the first and second drive-force transmitting paths that are provided in parallel with each other between the input rotary member and the output rotary member, wherein the drive force is to be transmitted by the gear mechanism through the first drive-force transmitting path, and wherein the drive force is to be transmitted by the continuously-variable transmission mechanism through the second drive-force transmitting path.

DETAILED DESCRIPTION OF PREFERRED EMBODIMENTS

Figure 1:
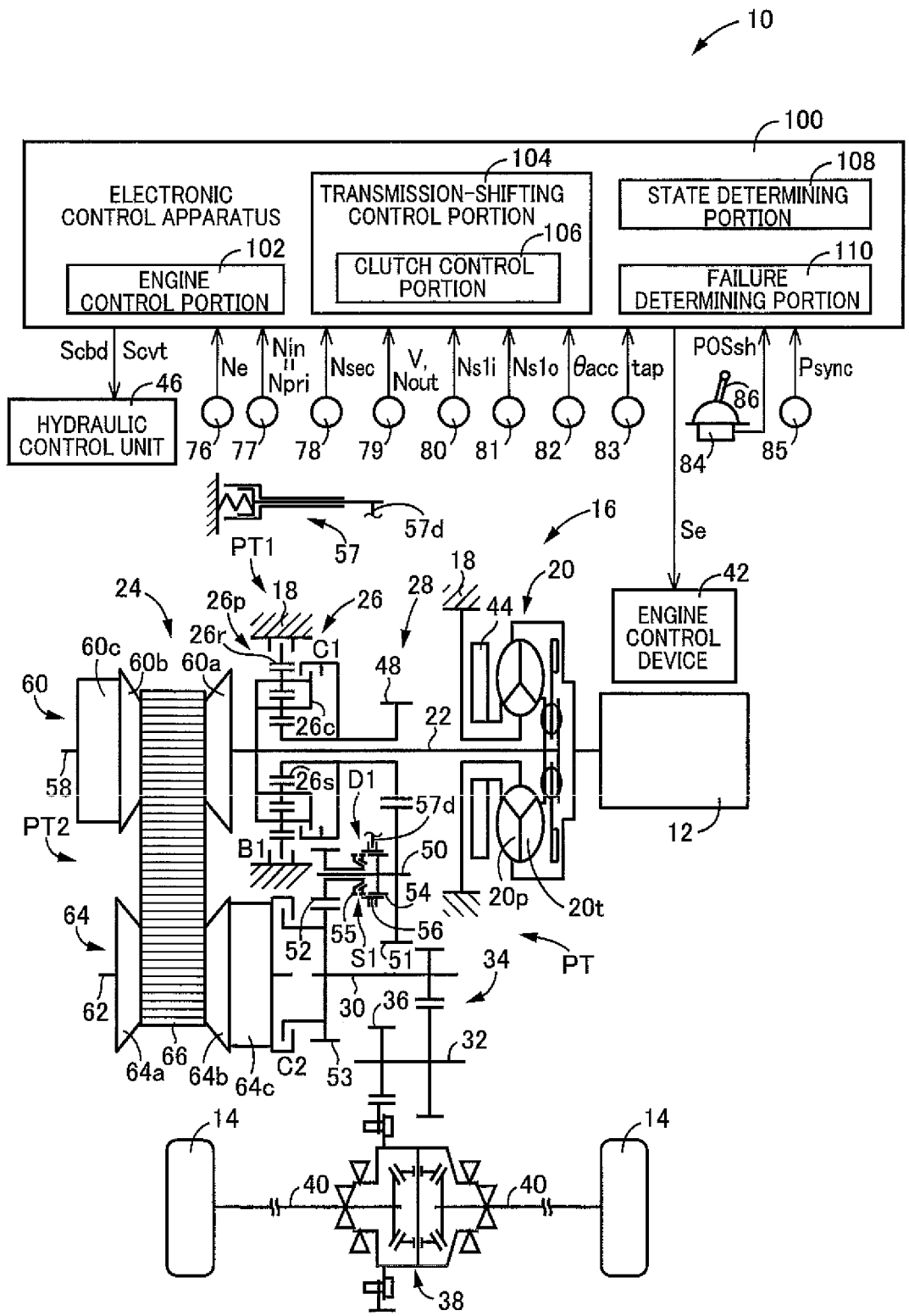
FIG. 1 is a schematic view showing a construction of a vehicle to be controlled by a control apparatus according to the present invention, and major control functions and control portions of the control apparatus.

In the embodiments of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. The vehicle having the drive-force transmitting apparatus is provided with a hydraulic control unit configured to control pulley hydraulic pressures as working fluids supplied to the respective hydraulic actuators, independently of each other. The hydraulic control unit may be configured to control a rate of flow of the working fluid supplied to each of the hydraulic actuators, for example, so as to consequently generate the pulley hydraulic pressures, for example. A shifting control operation is performed by the hydraulic control unit to execute a shifting action to establish a target gear ratio while preventing slippage of the transfer element, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

Further, the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/ rotational speed of the output rotary member". A vehicle running speed could be lower as the gear ratio is higher, and could be higher as the gear ratio is lower. For example, a highest gear ratio can be expressed also as a lowest-speed gear ratio.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, preferred embodiments of the invention will be described in detail with reference to the accompanying drawings.

First Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 by the gear mechanism 28. The second drive-force transmitting path PT2 is a path through which the drive force of the engine 12 is to be transmitted from the input shaft 22 toward the drive wheels 14 by the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as an engagement device, is provided in the first drive-force transmitting path PT1 and configured to selectively connect and disconnect the first drive-force transmitting path PT1, such that the first drive-force transmitting path PT1 is established with engagement of the first clutch C1 for forward running of the vehicle 10. The first brake B1, which serves as another engagement device, is provided in the first drive-force transmitting path PT1 and configured to selectively connect and disconnect the first drive-force transmitting path PT1, such that the first drive-force transmitting path PT1 is established with engagement of the first brake B1 for reverse running of the vehicle 10. That is, the first drive-force transmitting path PT1 is established with either the first clutch C1 or the first brake B1 being engaged. The second clutch C2, which serves as still another engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a corresponding one of hydraulic actuators C1a, B1a, C2a. Each of the first clutch C1 and the first brake B1 corresponds to "a first frictional engagement device" recited in the appended claims. The first clutch C1 is the first frictional engagement device for a forward running of the vehicle 10, while the first brake B1 is the first frictional engagement device for a reverse running of the vehicle 10. The second clutch C2 corresponds to "a second frictional engagement device" recited in the appended claims. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 100 (that corresponds to "control apparatus" recited in the appended claims), based on an operation amount θacc of an accelerator pedal that corresponds to a required drive force of the vehicle 10 required by an operator of the vehicle 10, whereby an engine torque Te as an output torque of the engine 12 is controlled.

The torque converter 20 is provided with a pump impeller 20p and a turbine impeller 20t that are connected to the engine 12 and the input shaft 22, respectively. The torque converter 20 is a fluid transmission device configured to transmit a drive force of the engine 12 to the input shaft 22. The drive-force transmitting apparatus 16 is provided with a mechanical oil pump 44 connected to the pump impeller 20p. The oil pump 44 is to be driven by the engine 12, to supply a pressurized working fluid as a source pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24 and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 51 which meshes with the small-diameter gear 48 and which is provided to be coaxial with the gear-mechanism counter shaft 50 and unrotatable relative to the gear-mechanism counter shaft 50. The large-diameter gear 51 has a diameter larger than that of the small-diameter gear 48. The gear mechanism 28 further includes an idler gear 52 that is provided to be coaxial with the gear-mechanism counter shaft 50 and rotatable relative to the gear-mechanism counter shaft 50, and an output gear 53 that is provided to be coaxial with the output shaft 30 and unrotatable relative to the output shaft 30. The output gear 53 has a diameter larger than that of the idler gear 52. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 51 and the idler gear 52 so as to selectively connect and disconnect a drive-force transmitting path between the two gears 51, 52. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged.

The dog clutch D1 includes: a clutch hub 54 that corresponds to "an input-side rotary member" recited in the appended claims; a clutch gear 55 that corresponds to "an output-side rotary member" recited in the appended claims; and a cylindrical-shaped sleeve 56. The clutch hub 54 is disposed on the gear-mechanism counter shaft 50 such that the clutch hub 54 is coaxial with the gear-mechanism counter shaft 50 and is unrotatable relative to the gear-mechanism counter shaft 50. The clutch gear 55 is fixed to the idler gear 52, and is located between the idler gear 52 and the clutch hub 54. The sleeve 56 is in splined engagement with the clutch hub 54 so as to be fitted on the clutch 54, and is unrotatable relative to the clutch hub 54 about an axis of the gear-mechanism counter shaft 50 and movable relative the clutch hub 54 in a direction parallel with the axis of the gear-mechanism counter shaft 50. In the thus constructed dog clutch D1, the idler gear 52 and the gear-mechanism counter shaft 50 are connected to each other, when the sleeve 56, which is always rotatable integrally with the clutch hub 54, is moved toward the clutch gear 55 to be brought into meshing engagement with the clutch gear 55. The dog clutch D1 is provided with a known synchromesh mechanism S1 for synchronizing rotations of the respective sleeve 56 and clutch gear 55 upon meshing engagement of the sleeve 56 with the clutch gear 55. The operation state of the dog clutch D1 is switched between an engaged state and a released state, with sliding movement of the sleeve 56, which is made by operation of a hydraulic actuator 57 as an actuator provided in the drive-force transmitting apparatus 16, in directions parallel to the axis of the gear-mechanism counter shaft 50. Thus, the dog clutch D1 is a dog clutch provided with the synchromesh mechanism S1, and is to be operated by the hydraulic actuator 57 to selectively connect and disconnect a drive-force transmitting path that corresponds to the first drive-force transmitting path PT1.

The first drive-force transmitting path PT1 is established with both of engagement of the dog clutch D1 and engagement of either one of the first clutch C1 and the first brake B1 which are located to be closer to the input shaft 22 than the dog clutch D1. A forward-running drive-force transmitting path is established by engagement of the first clutch C1, and a reverse-running drive-force transmitting path is established by engagement of the first brake B1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
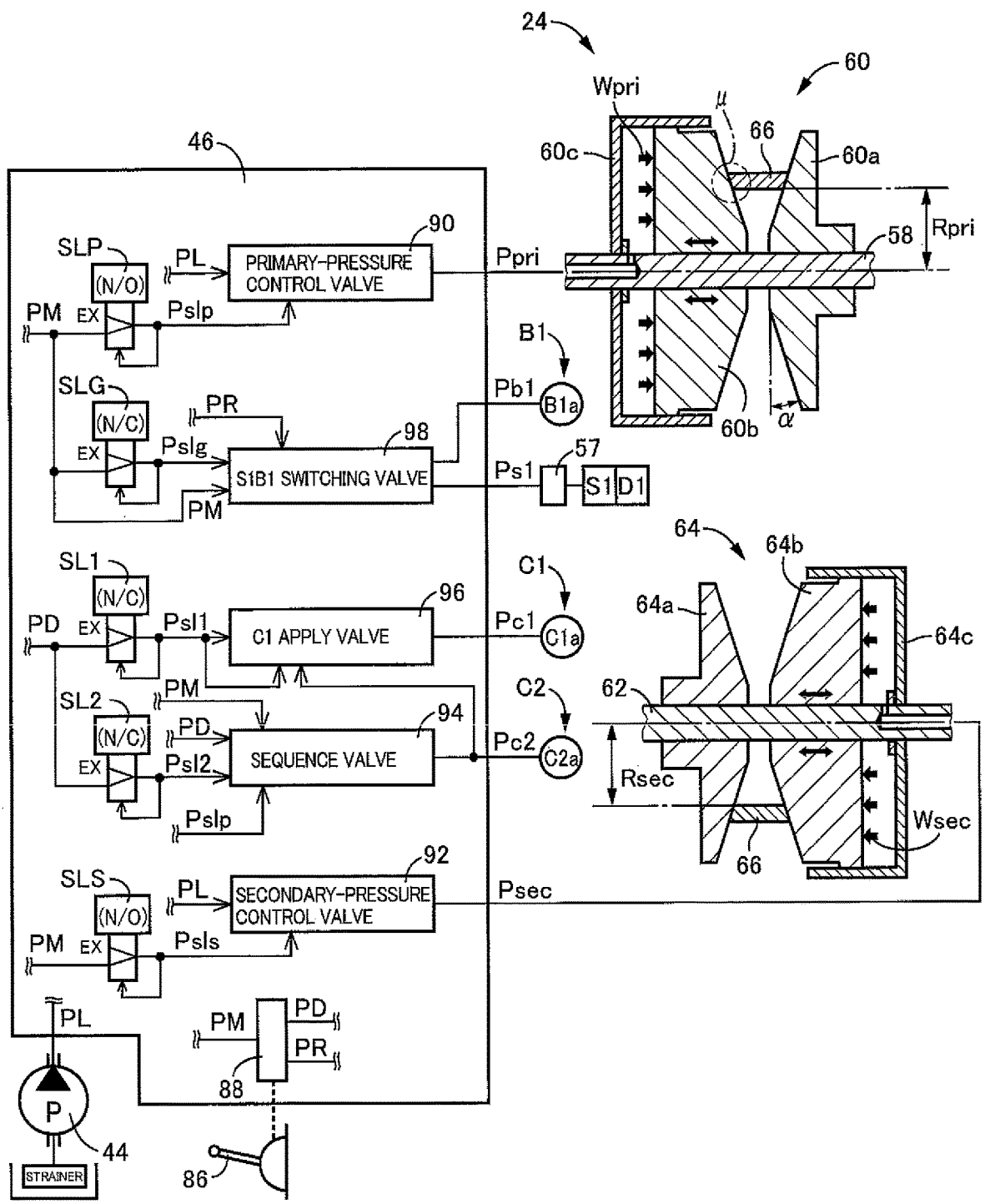
FIG. 2 is a view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure supplied from the hydraulic control unit 46 to the secondary hydraulic actuator 64c, and serves as a pulley hydraulic pressure for generating the secondary thrust Wsec.

In the continuously-variable transmission mechanism 24, the primary and secondary pressures Ppri, Pout are controlled by the hydraulic control unit 46 that is controlled by the electronic control apparatus 100, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding dimeter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. As described below, the gear ratio γcvt of the continuously-variable transmission mechanism 24 is changed with change of a thrust ratio τ (=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The secondary shaft 62 corresponds to "second-engagement-device rotary member" recited in the appended claims. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, the second clutch C2 is engaged while the first clutch C1 and the first brake B1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

Figure 3:
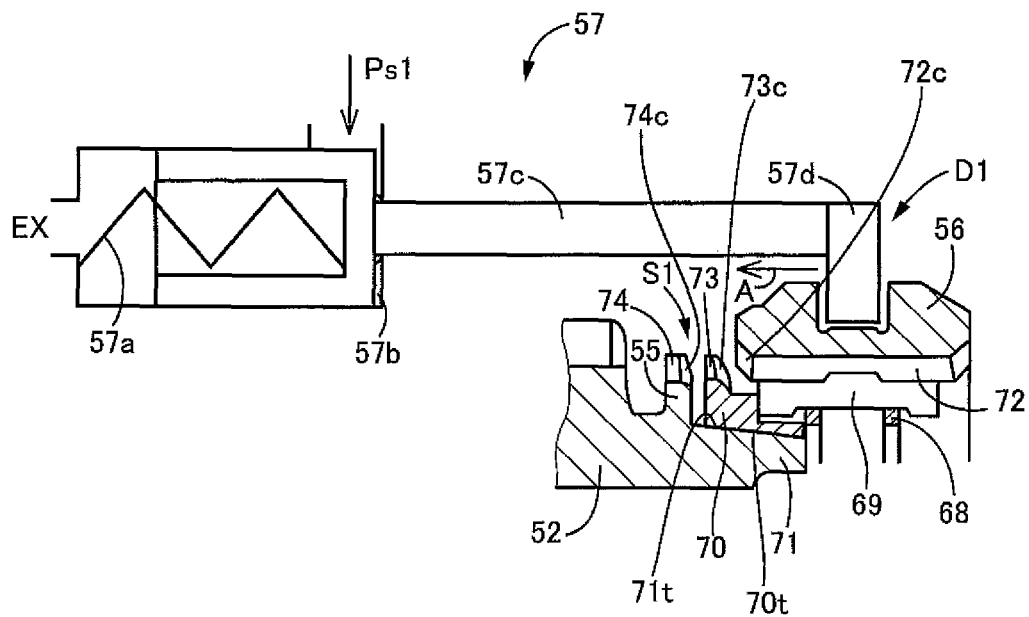
FIG. 3 is a view for explaining a construction of a dog clutch and a switching of the dog clutch between an engaged state and a released state, wherein the view shows the released state of the dog clutch.
Figure 4:
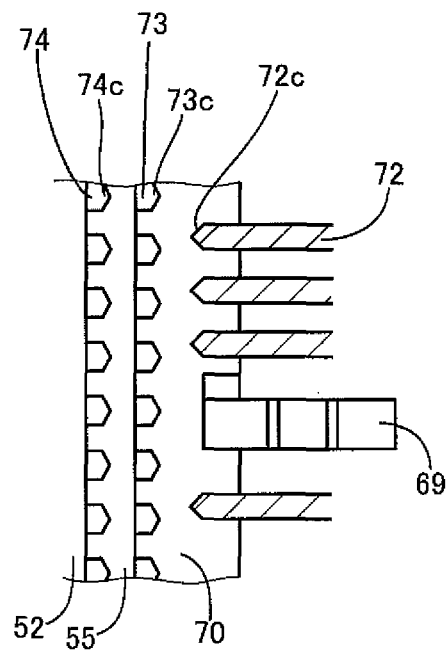
FIG. 4 is a developed view showing the state of the dog clutch shown in FIG. 3, with a cylindrical portion of a sleeve not being illustrated, as seen from an outer peripheral side of the dog clutch.
Figure 5:
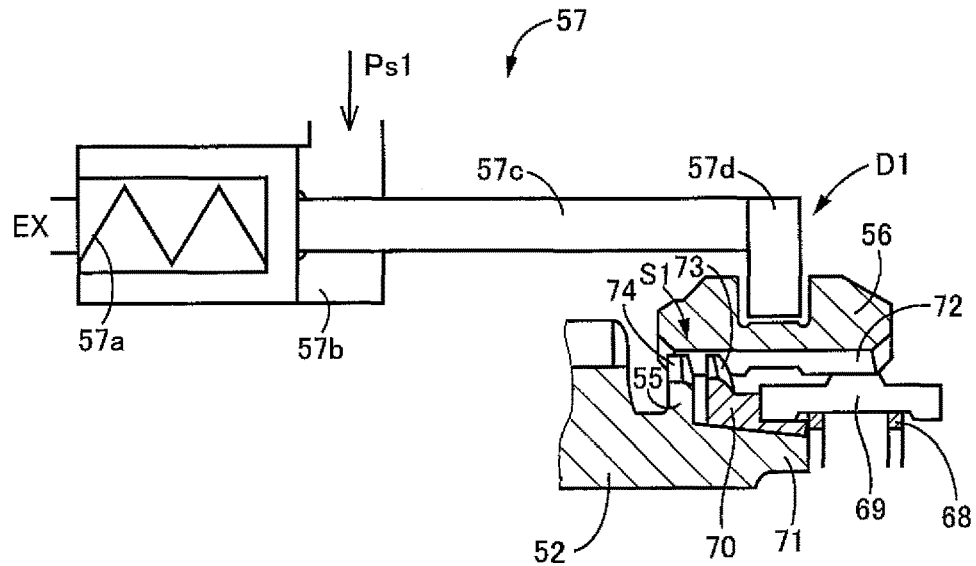
FIG. 5 is a view for explaining the construction of the dog clutch and the switching of the dog clutch between then engaged state and the released state, wherein the view shows the engaged state of the dog clutch.
Figure 6:
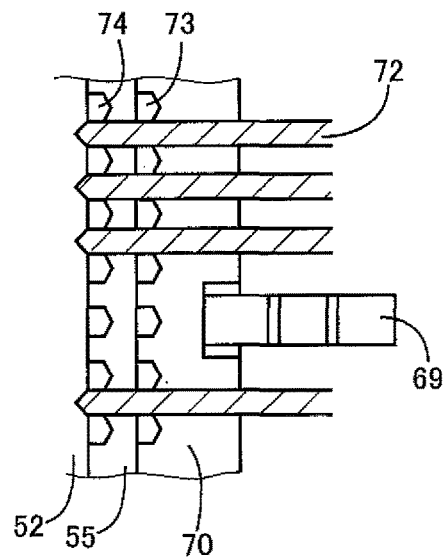
FIG. 6 is a developed view showing the state of the dog clutch shown in FIG. 5, with the cylindrical portion of the sleeve not being illustrated, as seen from the outer peripheral side of the dog clutch.

FIGS. 3-6 are views for explaining a construction of the dog clutch D1 and a switching of the dog clutch D1 between the engaged state and the released state. FIG. 3 shows the released state of dog clutch D1. FIG. 5 shows the engaged state of the dog clutch D1. Each of FIGS. 4 and 6 is developed view showing the state of the dog clutch D1 shown in a corresponding one of FIGS. 3 and 5, with a cylindrical portion of the sleeve 56 not being illustrated, as seen from an outer peripheral side of the dog clutch D1. As shown in FIGS. 3-6, the synchromesh mechanism S1 includes: key springs 68; a shifting key 69 engaged with the sleeve 56 by the key springs 68, a synchronizer ring (i.e., balk ring) 70 rotatable together with the shifting key 69 with a play between the synchronizer ring 70 and the shifting key 69; and a conical portion 71 provided in the clutch gear 55. The sleeve 56 has spline teeth 72 which is provided in its inner circumferential surface and which is in splined engagement with the clutch hub 54. With the sleeve 56 being moved from the releasing position shown in FIG. 3 toward the clutch gear 55 in a direction indicated by arrow A in FIG. 3, the synchronizer ring 70 is pressed onto the conical portion 71 through the shifting key 69, so that the drive force is transmitted to the clutch gear 55 owing to a friction force generated between a tapered inner circumferential surface 70t of the synchronizer ring 70 and a tapered outer circumferential surface 71t of the conical portion 71 that are brought into close contact with each other. Then, with the sleeve 56 being further moved toward the clutch gear 55 in a direction away from a releasing side of the synchronizing position that is opposite to the engaging side of the synchronizing position in the axial direction, the spline teeth 72 are brought into meshing engagements with spline teeth 73 provided in the synchronizer ring 70 and also with spline teeth 74 provided in the clutch gear 55, whereby the clutch hub 54 and the clutch gear 55 are integrally connected to each other and a drive-force transmitting path (corresponding to the first drive-force transmitting path PT1) is established between the forward/reverse switching device 26 and the output shaft 30. It is noted that the synchronizer ring 70 corresponds to "an annular member" recited in the appended claims.

The hydraulic actuator 57 includes a return spring 57a, a fluid chamber 57b, a fork shaft 57c and a shift fork 57d. In the dog clutch D1, a pressing force, which is based on a biasing force of the return spring 57a of the hydraulic actuator 57, is constantly applied to the sleeve 56 through the fork shaft 57c and the shift fork 57d, and constantly forces the sleeve 56 toward its releasing position (see FIG. 3). Meanwhile, a pressing force, which is based on a synchronization control pressure Ps1 regulated by the hydraulic control unit 46 and supplied to the fluid chamber 57b, acts against the biasing force of the return spring 57a, and serves as an engaging force that acts on the sleeve 56 through the fork shaft 57c and the shift fork 57d so as to cause the sleeve 56 to be moved toward its engaging position against the above-described pressing force based on the biasing force of the return spring 57a (see FIG. 5). Therefore, when the synchronization control pressure Ps1 supplied to the fluid chamber 57b is made higher than a given pressure value A, the sleeve 56 is moved to the engaging position. The given pressure value A corresponds to a lower limit of a predetermined range of the synchronization control pressure Ps1 which is required to move the sleeve 56 to the engaging position and which is obtained by experimentation or determined by an appropriate design theory. The predetermined range of the synchronization control pressure Ps1 is stored in the electronic control apparatus 100. It is noted that the above-described releasing position is a position in which the sleeve 56 is to be positioned to place the dog clutch D1 in the released state, and that the above-described engaging position is a position in which the sleeve 56 is to be positioned to place the dog clutch D1 in the engaged state.

The vehicle 10 is provided with the electronic control apparatus 100 as a controller including the control apparatus constructed according to present invention. For example, the electronic control apparatus 100 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission mechanism 24, and a hydraulic control operation for switching the operation state of each of the plurality of engagement devices (C1, B1, C2, D1). The electronic control apparatus 100 may be constituted by two or more control units exclusively assigned to perform different control operations such as the engine control operation and the hydraulic control operation.

The electronic control apparatus 100 receives various input signals based on values detected by respective sensors provided in the vehicle 10. Specifically, the electronic control apparatus 100 receives: an output signal of an engine speed sensor 76 indicative of an engine rotational speed Ne which is a rotational speed of the engine 12; an output signal of a primary speed sensor 77 indicative of a primary rotational speed Npri which is a rotational speed of the primary shaft 58 and which is equivalent to an input-shaft rotational speed Nin; an output signal of a secondary speed sensor 78 indicative of a secondary rotational speed Nsec which is a rotational speed of the secondary shaft 62; an output signal of an output speed sensor 79 indicative of an output-shaft rotational speed Nout which is a rotational speed of the output shaft 30 and which corresponds to the running speed V of the vehicle 10; an output signal of a dog-clutch input speed sensor 80 indicative of a synchronous input rotational speed $Ns1i$ that is a rotational speed of the gear-mechanism counter shaft 50 as an input-side rotational speed of the of the dog clutch D1; an output signal of a dog-clutch output speed sensor 81 indicative of a synchronous output rotational speed $Ns1o$ that is a rotational speed of the idler gear 52 as an output-side rotational speed of the of the dog clutch D1; an output signal of an accelerator-operation amount sensor 82 indicative of an accelerator operation amount θacc which represents an amount of accelerating operation made by a vehicle operator; an output signal of a throttle-opening degree sensor 83 indicative of the throttle opening degree tap; an output signal of a shift position sensor 84 indicative of an operation position POSsh of a manually-operated shifting device in the form of a shift lever 86 provided in the vehicle 10; and an output signal of a stroke sensor 85 indicative of a synchronization position Psync that is a digitalized value representing a position of the shift fork 57d and the fork shaft 57c corresponding to the position of the sleeve 56 between the releasing position and the engaging position in an axial direction of the gear-mechanism counter shaft 50. Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24 and a hydraulic-control command signal Scbd for performing hydraulic controls of operation states of the plurality of engagement devices. It is noted that the synchronization position Psync is made zero, for example, when the sleeve 56 is positioned in the releasing position, and is maximized (>0), for example, when the sleeve 56 is positioned in the engaging position. It is also noted that the input-shaft rotational speed Nin (=primary rotational speed Npri) is equivalent to a rotational speed of the turbine impeller 20t of the of the torque converter 20. It is further noted that the primary rotational speed Npri is equivalent to a rotational speed of the primary pulley 60 and that the secondary rotational speed Nsec is equivalent to a rotational speed of the secondary pulley 64. Further, the electronic control apparatus 100 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 86 is operable to be placed in a selected one of a plurality of operation positions POSsh that consist of, for example, a parking position P, a reverse position R, a neutral position N and a forward drive position D. With the shift lever 86 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 86 being placed in the reverse position R, the drive-force transmitting apparatus 16 is placed in its reverse drive position for enabling the reverse running of the vehicle 10 in the gear running mode. With the shift lever 86 being placed in the neutral position N, the drive-force transmitting apparatus 16 is placed in its neutral position in which the drive-force transmitting apparatus 16 is placed in its neutral state. With the shift lever 86 being placed in the forward drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

As shown in FIG. 2, the hydraulic control unit 46 includes a plurality of solenoid valves SL, a mechanical valve 88, a primary-pressure control valve 90, a secondary-pressure control valve 92, a sequence valve 94, a C1 apply valve 96 and an S1B1 switching valve 98.

The mechanical valve 88 is mechanically associated with the shift lever 86, so that an operation state of the mechanical valve 88 is to be switched in association with a switching operation made through the shift lever 86 by the vehicle operator, namely, a fluid passage defined by the mechanical valve 88 is changed by the switching operation. The mechanical valve 88 is operated such that a modulator pressure PM, which is inputted to the mechanical valve 88, is outputted as a drive pressure PD when the shift lever 86 is placed in the drive position D, and such that the modulator pressure PM is outputted as a reverse pressure PR when the shift lever 86 is placed in the reverse position R. Further, when the shift lever 86 is placed in the neutral position N or in the parking position P, the mechanical valve 88 is operated to stop flow of the modulator pressure PM therethrough, and to cause the drive pressure PD and the reverse pressure PR to be discharged. The drive pressure PD may be referred also to as a drive range pressure or a forward hydraulic pressure. The reverse pressure PR may be referred also to as a reverse range pressure or a reverse hydraulic pressure. The hydraulic control unit 46 further includes a primary regulator valve (not shown) to which a hydraulic pressure is supplied from the oil pump 44. The hydraulic pressure supplied to the primary regulator valve is regulated, by the primary regulator valve, to a pressure value dependent on a degree of an engine load that is represented by, for example, the throttle opening degree tap. The thus regulated hydraulic pressure is supplied as a line pressure PL to a modulator valve (not shown) that is also included in the hydraulic control unit 46. The line pressure PL is regulated by the modulator valve to a certain pressure value, and is supplied as the modulator pressure PM to the mechanical valve 88.

Each of the plurality of solenoid valves SL is subjected to an electric-current control executed by the electronic control apparatus 100, so as to regulate a hydraulic pressure and output the regulated hydraulic pressure, by using the working fluid supplied from the oil pump 44. The plurality of solenoid valves SL include a C1 solenoid valve SL1, a C2 solenoid valve SL2, a D1 solenoid valve SLG, a primary-pulley solenoid valve SLP and a secondary-pulley solenoid valve SLS. The C1 solenoid valve SL1, C2 solenoid valve SL2 and D1 solenoid valve SLG are normally-closed electromagnetic valves. The primary-pulley solenoid valve SLP and secondary-pulley solenoid valve SLS are normally-open electromagnetic valves. Each of the normally-closed electromagnetic valves is placed in an OFF-failure state in which the valve does not output a hydraulic pressure in the event of an electrical disconnection in which, for example, supply of a drive current from the electronic control apparatus 100 is cut off. Each of the normally-open electromagnetic valves is placed in an ON-failure state in which the valve outputs a maximum hydraulic pressure in the event of the electrical disconnection.

The C1 solenoid valve SL1 receives the drive pressure PD as a source pressure, and outputs a SL1 pressure Psl1 that is to be converted into a C1 control pressure Pc1 supplied to the hydraulic actuator C1$a$ of the first clutch C1. That is, the C1 solenoid valve SL1 is configured to regulate the C1 control pressure Pc1 by which the first clutch C1 is to be operated. The C2 solenoid valve SL2 receives the drive pressure PD as a source pressure, and outputs a SL2 pressure Psl2 that is to be converted into a C2 control pressure Pc2 supplied to the hydraulic actuator C2$a$ of the second clutch C2. That is, the C2 solenoid valve SL2 is configured to regulate the C2 control pressure Pc2 by which the second clutch C2 is to be operated.

The D1 solenoid valve SLG receives the modulator pressure PM as a source pressure, and outputs a SLG pressure Pslg that is to be converted into a synchronization control pressure Ps1 supplied to the hydraulic actuator 57 for switching an operation state of the dog clutch D1. That is, the D1 solenoid valve SLG is configured to regulate the synchronization control pressure Ps1 by which the dog clutch D1 is to be operated. It is noted that, upon reverse running of the vehicle 10 in which the reverse pressure PR is outputted from the mechanical valve 88 with the shift lever 86 being placed in the reverse position R, the SLG pressure Pslg can be converted into a B1 control pressure Pb1 supplied to a hydraulic actuator B1$a$ of the first brake B1. That is, the D1 solenoid valve SLG is configured, upon reverse running of the vehicle 10, to regulate the B1 control pressure Pb1 by which the first brake B1 is to be operated.

The primary-pulley solenoid valve SLP receives the modulator pressure PM as a source pressure, and outputs a SLP pressure Pslp for controlling the primary pressure Ppri that is supplied to the hydraulic actuator 60$c$ of the primary pulley 60. That is, the primary-pulley solenoid valve SLP is configured to regulate the primary pressure Ppri by which the primary pulley 60 is to be operated. The secondary-pulley solenoid valve SLS receives the modulator pressure PM as a source pressure, and outputs a SLS pressure Psls for controlling the secondary pressure Psec that is supplied to the hydraulic actuator 64$c$ of the secondary pulley 64. That is, the secondary-pulley solenoid valve SLS is configured to regulate the secondary pressure Psec by which the secondary pulley 64 is to be operated.

The primary-pressure control valve 90 receives the line pressure PL as a source pressure, and is operated based on the SLP pressure Pslp so as to regulate the primary pressure Ppri. The secondary-pressure control valve 90 receives the line pressure PL as a source pressure, and is operated based on the SLS pressure Psls so as to regulate the secondary pressure Psec.

The sequence valve 94 is placed in a selected one of a normal position and a failure position, which is selected based on the SLP pressure Pslp. When being placed in the normal position, the sequence valve 94 establishes a fluid passage through which the SL2 pressure Psl2 is to be supplied to the second clutch C2. When being placed in the failure position, the sequence valve 94 establishes a fluid passage through which the drive pressure PD is to be supplied to the second clutch C2. The sequence valve 94 is held in the normal position by the modulator pressure PM and a biasing force of a spring (not shown), and is switched to the failure position when the SLP pressure Pslp is applied to the sequence valve 94. The SLP pressure Pslp having at least a predetermined pressure value is outputted when the C2 solenoid valve SL2 is placed in the OFF-failure state, for example, in the event of the electrical disconnection, whereby the sequence valve 94 is switched to the failure position. In this instance, if the shift lever 86 is placed in the forward drive position D, the drive pressure PD is compulsorily supplied to the second clutch C2 whereby the second clutch C2 is engaged. Each of the SL2 pressure Psl2 and the drive pressure PD is supplied as the C2 control pressure Pc2 to the second clutch C2 through the sequence valve 94.

The C1 apply valve 96 is placed in a selected one of a normal position and a failure position, which is selected based on the SL1 pressure Psl1 and the C2 control pressure Pc2. When being placed in the normal position, the C1 apply valve 96 establishes a fluid passage through which the SL1 pressure Psl1 is to be supplied to the first clutch C1. When being placed in the failure position as a tie-up preventing state, the C1 apply valve 96 establishes a fluid passage through which the C1 control pressure Pc1 is to be discharged. The C1 apply valve 96 is switched to the failure position, when the SL1 pressure Psl1 and the C2 control pressure Pc2 are both applied to the C1 apply valve 96. The SL1 pressure Psl1 is supplied as the C1 control pressure Pc1 to the first clutch C1 through the C1 apply valve 96. The C1 apply valve 96 serves as a fail-safe valve that prevents a tie-up made by concurrent engagements of the first and second clutches C1, C2, by cutting off the fluid passage through which the SL1 pressure Psl1 is to be supplied as the C1 control pressure Pc1 to the first clutch C1.

The S1B1 switching valve 98 is placed in a selected one of a non-R position and an R position, which is selected based on the reverse pressure PR. When being placed in the non-R position, the S1B1 switching valve 98 establishes a fluid passage through which the SLG pressure Pslg is to be supplied to the hydraulic actuator 57, and also another fluid passage through which the B1 control pressure Pb1 is to be discharged. When being placed in the R position, the S1B1 switching valve 98 establishes a fluid passage through which the modulator pressure PM is to be supplied to the hydraulic actuator 57, and also another fluid passage through which the SLG pressure Pslg is to be supplied to the first brake B1. The S1B1 switching valve 98 is switched to the R position when the reverse pressure PR is applied to the S1B1 switching valve 98. The SLG pressure Pslg is supplied as the synchronization control pressure Ps1 to the hydraulic actuator 57 when the shift lever 85 is placed in any one of the operation positions that are other than the reverse position R. On the other hand, when the shift lever 85 is placed in the reverse position R, namely, when the vehicle 10 runs in a reverse direction, the SLG pressure Pslg is supplied as the B1 control pressure Pb1 to the first brake B1 through the S1B1 switching valve 98. Further, when the shift lever 85 is placed in the reverse position R, the modulator pressure PM is supplied as the synchronization control pressure Ps1 to the hydraulic actuator 57 through the S1B1 switching valve 98. Further, for reverse running of the vehicle 10, the dog clutch D1 is engaged with supply of the modulator pressure PM to the dog clutch D1.

For performing various control operations in the vehicle 10, the electronic control apparatus 100 includes an engine control means or portion in the form of an engine control portion 102 and a transmission shifting control means or portion in the form of a transmission-shifting control portion 104.

The engine control portion 102 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 102 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

The transmission-shifting control portion 104 includes a clutch control means or portion in the form of a clutch control portion 106 that is configured, when the operation position POSsh of the shift lever 86 is the parking position P or the neutral position N during stop of the vehicle 10, to supply, to the hydraulic control unit 46, the hydraulic-control command signal Scbd requesting engagement of the dog clutch D1, in preparation of transition to the gear running mode. When the operation position POSsh of the shift lever 86 is the parking position P or the neutral position N during stop of the vehicle 10, the transmission-shifting control portion 104 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission-shifting control portion 104 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission-shifting control portion 104 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission-shifting control portion 104 executes a switching control operation for switching the running mode between the gear running mode and the belt running mode. Specifically, the transmission-shifting control portion 104 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission-shifting control portion 104 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission-shifting control portion 104 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission-shifting control portion 104 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following descriptions relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission-shifting control portion 104 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission-shifting control portion 104 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following descriptions relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

The clutch control portion 106 supplies, to the hydraulic control unit 46, the hydraulic-control command signal Scbd requesting engagement of the dog clutch D1, for example, after starting of the engine 12 has been completed. Further, the clutch control portion 106 supplies, to the hydraulic control unit 46, the hydraulic-control command signal Scbd requesting release of the dog clutch D1 when the vehicle running speed V is increased to a high speed range during the belt running mode after execution of the stepped shift-up action. Further, when the running speed V is reduced to a middle speed range after having been increased to the high speed range during the belt running mode, the clutch control portion 106 supplies, to the hydraulic control unit 46, the hydraulic-control command signal Scbd requesting engagement of the dog clutch D1, in preparation of transition to the gear running mode.

Figure 7:
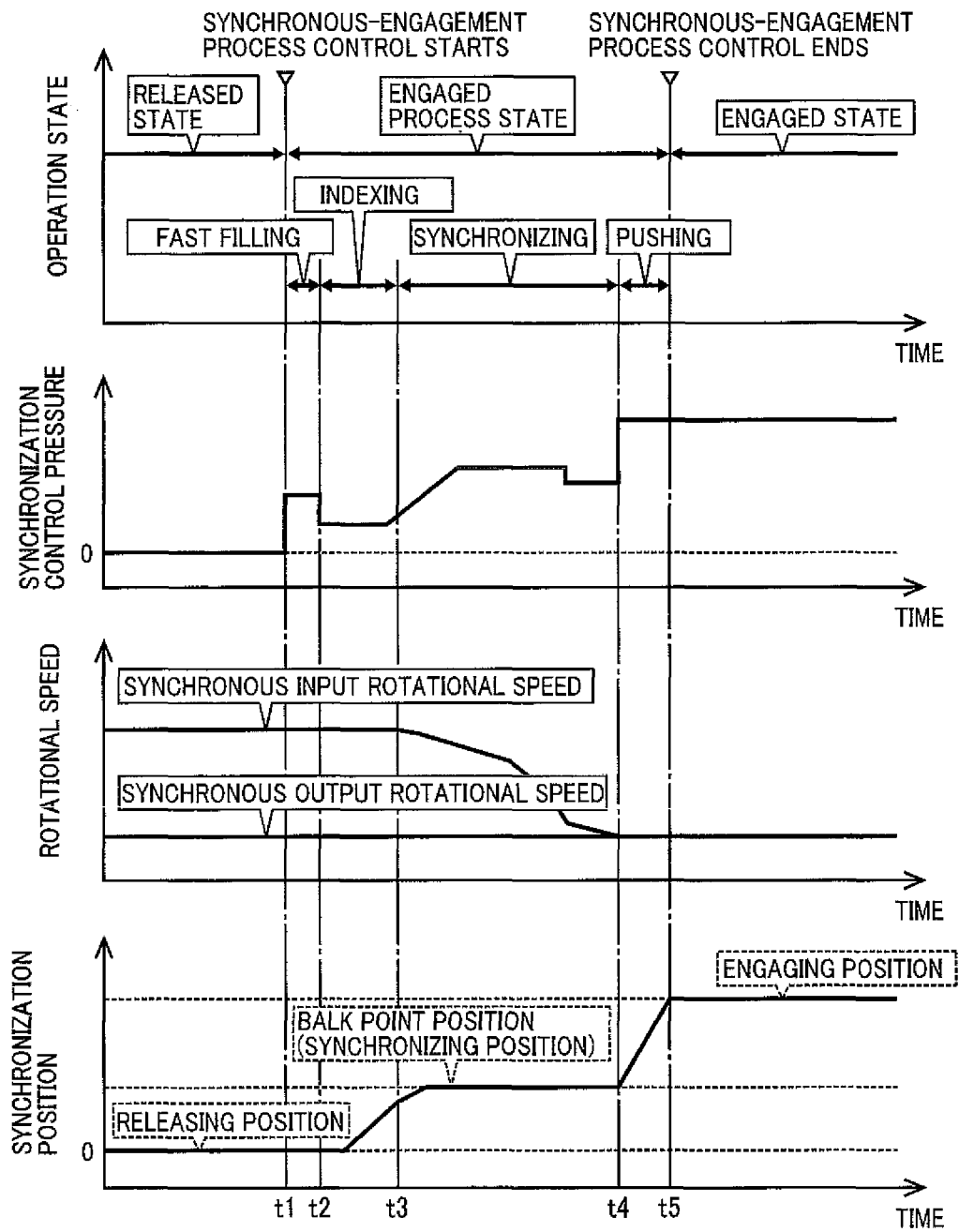
FIG. 7 is a time chart showing, by way of example, a synchronous-engagement process control.

FIG. 7 is a time chart showing, by way of example, a synchronous-engagement process control that is executed by the clutch control portion 106 to cause the hydraulic actuator 57 and the synchromesh mechanism S1 to be operated for switching the operation state of the dog clutch D1 from the released state to the engaged state. As shown in FIG. 7, the operation state of the dog clutch D1 is roughly classified into three states consisting of the released state, engaged process state and engaged state. The released state of the dog clutch D1 is a state in which the synchronization control pressure Ps1 is made zero whereby the value of the synchronization position Psync is made zero that corresponds to the releasing position, namely, a state in which the dog clutch D1 is fully released (see a stage until a point t1 of time in FIG. 7). The released state of the dog clutch D1 is synonymous with a fully released state of the dog clutch D1. The engaged process state of the dog clutch D1 is a state in which the dog clutch D1 is in process of being switched from the released state to the engaged state, namely, is a state in which the synchronous-engagement process control is being executed (see a stage from the point t1 of time until a point t5 of time in FIG. 7). When the execution of the synchronous-engagement process control is initiated, a plurality of steps are sequentially implemented. The plurality of steps include, for example, a fast filling step, an indexing step, a synchronizing step and a pushing step, which are implemented in this order of description. The fast filling step is a step that is implemented to raise an actual value of the synchronization control pressure Ps1, by temporarily outputting a high command value of the synchronization control pressure Ps1 (see a stage from the point t1 of time until a point t2 of time in FIG. 7). The indexing step is a step that is implemented to move the sleeve 56 such that the value of the synchronization position Psync corresponds to a certain value required for the synchronization that is to be made by the synchromesh mechanism S1, wherein the synchronization position Psync may be defined by a position of a chamfered portion 72c of each spline tooth 72 of the sleeve 56 relative to a chamfered portion 73c of each spline tooth 73 of the synchronizer ring 70 (see a stage from the point t2 of time until the point t3 of time in FIG. 7). The synchronization that is to be made by the synchromesh mechanism S1 is a synchronization between the synchronous input rotational speed Ns1$i$ (corresponding to a rotational speed of the clutch hub 54 as the input-side rotary member) and the synchronous output rotational speed Ns1$o$ (corresponding to a rotational speed of the clutch gear 55 as the output-side rotary member). That is, the synchronization corresponds to a state in which a synchronization rotational speed difference $\Delta$Ns1 (=|Ns1$i$−Ns1$o$|), which is a rotational speed difference between the synchronous input rotational speed Ns1$i$ and the synchronous output rotational speed Ns1$o$, is zero. The synchronizing step is a step for synchronizing the synchronous input rotational speed Ns1$i$ and the synchronous output rotational speed Ns1$o$, owing to the friction fore generated between the tapered inner circumferential surface 70$t$ of the synchronizer ring 70 and the tapered outer circumferential surface 71t of the conical portion 71 that are brought into close contact with each other (see a stage from the point t3 of time until a point t4 of time in FIG. 7). At this synchronizing step, the transmission of the drive force through the dog clutch D1 is initiated and the synchronization is eventually completed by the synchromesh mechanism S1. The synchronization position Psync, at a point of time at which the synchronization is to be completed, is referred to as a balk point position, i.e., a synchronizing position. That is, the synchronizing position corresponds to a predetermined value of the synchronization position Psync in which the synchronization rotational speed difference ΔNs1 is to be made zero. The pushing step is a step for moving the sleeve 56 by maximizing the command value of the synchronization control pressure Ps1, such that the synchronization position Psync is moved from the synchronizing position to the engaging position whereby the chamfered portion 72c of each spline tooth 72 of the sleeve 56 is brought into contact with a chamfered portion 74c of each spline tooth 74 of the clutch gear 55 and then the spline teeth 72 are brought into meshing engagements with the spline teeth 74 (see the stage from the point t4 of time until a point t5 of time in FIG. 7). The engaged state of the dog clutch D1 is a state in which the meshing engagements of the spline teeth 72 and the spline teeth 74 are completed and the synchronization position Psync is located in the engaging position with the value of the synchronization position Psync being maximized, so that the dog clutch D1 is fully engaged (see a stage after the point t5 of time). The engaged state of the dog clutch D1 is synonymous with a fully engaged state of the dog clutch D1.

For executing a shifting action in the continuously-variable transmission mechanism 24 during the belt running mode, the transmission-shifting control portion 104 supplies, to the hydraulic control unit 46, the hydraulic-control command signal Scvt for controlling the primary pressure Ppri and the secondary pressure Psec such that the target gear ratio γcvttgt is established in the continuously-variable transmission mechanism 24 while the belt slippage is not caused in the continuously-variable transmission mechanism 24.

Specifically, the transmission-shifting control portion 104 calculates the target primary rotational speed Nprit by applying the accelerator operation amount θacc and the vehicle running speed V into a predetermined relationship in the form of a CVT shifting map. Then, the transmission-shifting control portion 104 calculates the target gear ratio γcvttgt (=Nprit/Nsec) based on the target primary rotational speed Nprit. Further, the transmission-shifting control portion 104 calculates an estimated value of the engine torque Te, for example, by applying the throttle opening degree tap and the engine rotational speed Ne to a predetermined relationship such as an engine torque map. Then, the transmission-shifting control portion 104 calculates a turbine torque Tt, based on the estimated value of the engine torque Te and a predetermined relationship such as characteristic of the torque converter 20. The transmission-shifting control portion 104 handles or regards the turbine torque Tt as a primary input torque Tpri that is an input torque inputted to the primary pulley 60. The primary input torque Tpri is a torque that is to act on the primary shaft 58. The transmission-shifting control portion 104 calculates a thrust ratio τ for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission-shifting control portion 104 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission-shifting control portion 104 converts the target primary thrust Wprit and the target secondary thrust Wsect into a target primary pressure Pprit (=Wprit/pressure receiving area) and a target secondary pressure Psect (=Wsect/pressure receiving area), respectively. The transmission-shifting control portion 104 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

In calculation of each of the target primary thrust Wprit and the target secondary thrust Wsect, a required thrust, which is minimally required to prevent the belt slippage in the continuously-variable transmission mechanism 24, is taken into consideration. This required thrust is a belt-slip limit thrust that is a thrust value shortly before occurrence of the belt slippage in the continuously-variable transmission mechanism 24.

The transmission-shifting control portion 104 sets a primary limit thrust Wprilim that is the limit thrust for the primary pulley 60 and a secondary limit thrust Wseclim that is the limit thrust for the secondary pulley 64. The transmission-shifting control portion 104 sets the primary limit thrust Wprilim by using equation (1) given below, and sets the secondary limit thrust Wseclim by using equation (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24 (see FIG. 2). It is noted that the sheave angle α is an angle defined between a conical surface of each of the pulleys 60, 64 and a plane perpendicular to an axis of a corresponding one of the pulleys 60, 64 (see FIG. 2).

$$Wprilim = (Tpri * \cos \alpha)/(2 * \mu * Rpri) \tag{1}$$

$$Wseclim = (\gamma cvt * Tpri * \cos \alpha)/(2 * \mu * Rsec) \tag{2}$$

The transmission-shifting control portion 104 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission-shifting control portion 104 sets, as a target secondary thrust Wsect, a larger one of the secondary limit thrust Wseclim and the secondary shifting-control thrust Wsecsh. The transmission-shifting control portion 104 calculates the target primary thrust Wprit (=Wsect/τ), based on the target secondary thrust Wsect and the thrust ratio τ that is required to establish the target gear ratio γcvtt.

By the way, during execution of the synchronous-engagement process control, if the synchronizing step is followed by the pushing step even in a state in which the synchronization between the synchronous input rotational speed Ns1$i$ and the synchronous output rotational speed Ns1$o$ is not yet completed due to some factors, a gear noise, i.e., a funny noise could be generated by contacts of the chamfered portions 72$c$ of the spline teeth 72 of the sleeve 56 with the chamfered portions 74$c$ of the spline teeth 74 of the clutch gear 55. If the synchronization control pressure Ps1 is kept be applied to the hydraulic actuator 57 in such a state in which the gear noise could be generated, there is a risk that durability of the synchromesh mechanism S1 and other parts of the dog clutch D1 would be reduced by collisions of the chamfered portions 72$s$ of the spline teeth 72 with the chamfered portions 74$c$ of the spline teeth 74. In a transmission having a construction based on a known synchronous meshing parallel two-axes type manual automatic transmission and capable of automatically switching the operation state of the dog clutch, generation of the gear noise is allowed to some extent. However, in the present embodiment, since the transmission of the vehicle 10 is an automatic transmission provided with the continuously-variable transmission mechanism 24, it is desirable to restrain or minimize the generation of a funny noise such as the gear noise. It is noted that the above-described factors include reduction of the friction force generated between the mutually-contacted tapered surfaces of the respective synchronizer ring 70 and conical portion 71, which results from a temporary reduction of coefficient of the friction due to heat generated between the contacted tapered surfaces or from a deterioration of friction members constituting the contacted tapered surfaces due to the generated heat.

When detecting that the synchronization rotational speed difference ΔNs1 is not smaller than a certain difference value even with the synchronization position Psync (i.e., the position of the sleeve 56) being advanced further than the synchronizing position, the electronic control apparatus 100 determines that it is a failure state with risk of generation of a gear noise. In this case, the electronic control apparatus 100 suspends or stops the execution of the synchronous-engagement process control, and places the operation state of the dog clutch D1 back into the released state, by setting a command value of the synchronization control pressure Ps1 to zero.

Specifically, the electronic control apparatus 100 further includes a state determining means or portion in the form of a state determining portion 108 and a failure determining means or portion in the form of a failure determining portion 110, for realizing function of stopping the execution of the synchronous-engagement process control in the above-described failure state with risk of generation of the gear noise.

The state determining portion 108 determines whether the operation state of the dog clutch D1 is the engaged process state, for example, based on the command value of the synchronization control pressure Ps1 and the synchronization position Psync (i.e., the position of the sleeve 56 in the axial direction). Further, the state determining portion 108 determines whether the operation state of the dog clutch D1 has been switched from the engaged process state to the engaged state, for example, based on the synchronization position Psync. Thus, the determination as to whether the dog clutch D1 is in process of engagement is made by the state determining portion 108.

When it is determined by the state determining portion 108 that the dog clutch D1 is in process of engagement, the failure determining portion 110 determines whether there is a possibility that the gear noise would be generated in the dog clutch D1, depending on whether the rotational speed difference ΔNs1 is equal to or larger than a given difference value with the synchronization position Psync being located on an engaging side of the synchronizing position. The given difference value is, for example, a predetermined lower limit value of a range of the synchronization rotational speed difference ΔNs1 in which the gear noise is likely to be generated if the execution of the synchronous-engagement process control is proceeded.

As an example of the case in which the synchronization position Psync is located on the engaging side of the synchronizing position even with the synchronization rotational speed difference ΔNs1 being not smaller than the given difference value, there is a case in which the synchronization position Psync is advanced to the engaging side of the synchronizing position before the synchronization rotational speed difference ΔNs1 becomes zero, namely, before the synchronization is completed. In such a case, it is determined that a balk failure occurs, namely, that the execution of the synchronous-engagement process control has been unintentionally proceeded to the pushing step for the above-described factors, without the synchronization being completed by the synchromesh mechanism S1. In the failure state, there is a possibility that the gear noise would occur in the dog clutch.

The failure determining portion 110 determines whether the synchronization position Psync is located on the engaging side of the synchronizing position even with the synchronization rotational speed difference ΔNs1 being not smaller than the given difference value, depending on whether the synchronization position Psync is located to be distant from the synchronizing position by at least a given distance value α on the engaging side of the synchronizing position, before the rotational speed difference ΔNs1 becomes zero. The given distance value α is, for example, a predetermined threshold value for determining that the synchronization position Psync has been advanced onto the engaging side of the synchronizing position before completion of the synchronization.

The failure determining portion 110 determines whether the synchronization rotational speed difference ΔNs1 is not yet made zero, depending on whether the synchronization rotational speed difference ΔNs1 is equal to or larger than the given difference value A. The given difference value A is, for example, a predetermined threshold value for determining that the synchronization rotational speed difference ΔNs1 is not made zero when the synchronization position Psync is located in the synchronizing position.

The failure determining portion 110 determines whether the synchronization position Psync is located to be distant from the synchronizing position by at least the given distance value α on the engaging side of the synchronizing position, depending on whether a state in which synchronization position Psync is located to be distant from the synchronizing position by at least the given distance value α on the engaging side of the synchronizing position, continues for at least a given length A of time. That is, the failure determining portion 110 determines whether the synchronization position Psync is located in a given position or located on the engaging side of the given position, and then determines whether a state in which the synchronization position Psync is located in the given position or located on the engaging side of the given position, continues for at least the given length A of time. The given position has a value corresponding a sum of the given distance value α and a value of the synchronization position Psync when the synchronization position Psync is located in the synchronizing position. The given length of time A is, for example, a predetermined lower limit length of time that is minimally required to determine that the balk failure occurs.

When the failure determining portion 110 determines that the synchronization rotational speed difference ΔNs1 is not smaller than the given difference value A and the state in which the synchronization position Psync is located in the given position or located on the engaging side of the given position continues for at least the given length A of time, the failure determining portion 110 determines that the balk failure occurs, namely, sets a balk-failure determining flag to "ON".

During execution of the synchronous-engagement process control, when it is determined by the failure determining portion 110 that there is a possibility that the gear noise would be generated in the dog clutch D1, the clutch control portion 106 suspends or stops the execution of the synchronous-engagement process control and supplies, to the hydraulic control unit 46, the hydraulic-control command signal Scbd requesting the hydraulic actuator 57 to be operated to operate the synchromesh mechanism S1 such that the dog clutch D1 is placed back into the released state.

Figure 8:
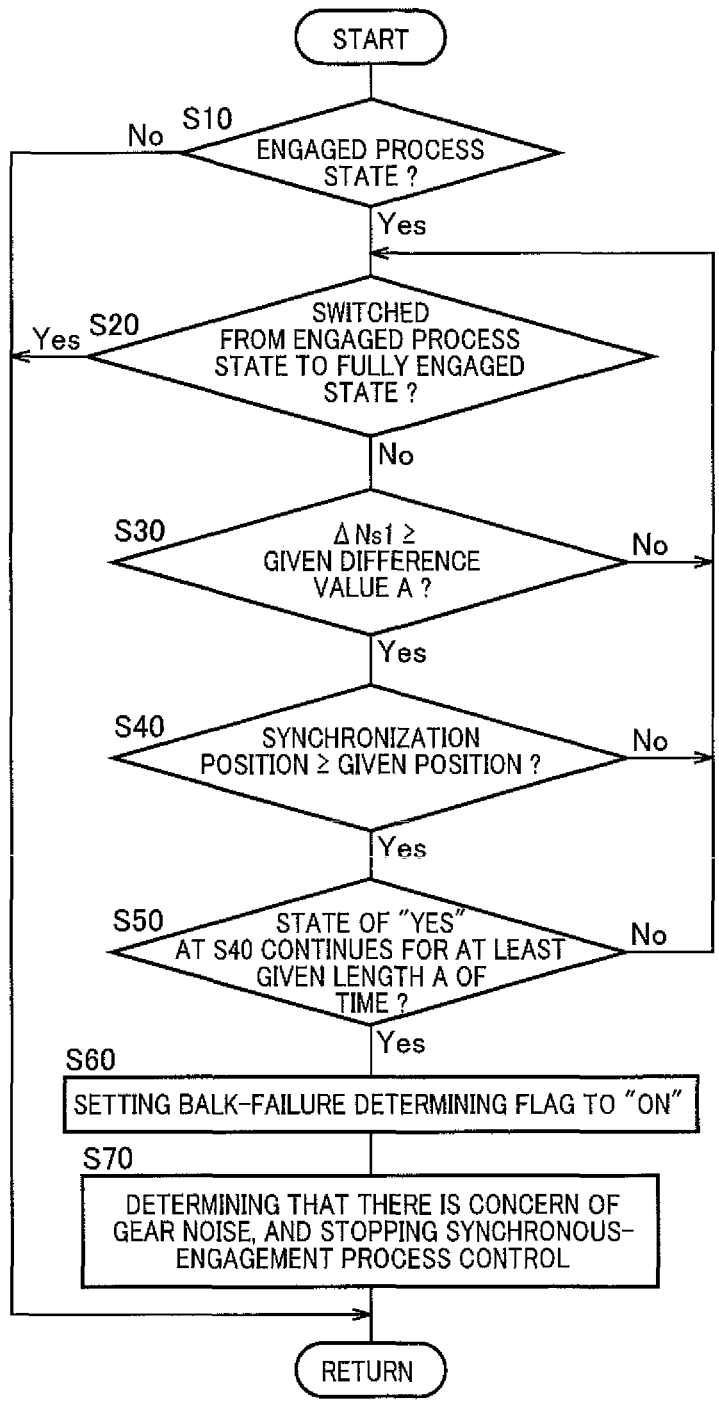
FIG. 8 is a flow chart showing a main part of a control routine executed by the control apparatus, namely, a control routine that is executed for avoiding or reducing generation of a gear noise during process of engagement of the dog clutch, wherein the control routine is according to a first embodiment of the invention.

FIG. 8 is a flow chart showing a main part of a control routine executed by the electronic control apparatus 100, namely, a control routine that is executed for avoiding or reducing generation of the gear noise during process of engagement of the dog clutch D1. The control routine is executed, for example, in a repeated manner.

As shown in FIG. 8, the control routine is initiated with step S10 corresponding to function of the state determining portion 108, which is implemented to determine whether the operation state of the dog clutch D1 is the engaged process state. When a negative determination is made at step S10, one cycle of execution of the control routine is completed. When an affirmative determination is made at step S10, step S20 corresponding to function of the state determining portion 108 is implemented to determine whether the operation state of the dog clutch D1 has been switched from the engaged process state to the fully engaged state. When an affirmative determination is made at step S20, one cycle of execution of the control routine is completed. When a negative determination is made at step S20, step S30 corresponding to function of the failure determining portion 110 is implemented to determine whether the synchronization rotational speed difference ΔNs1 is equal to or larger than the given difference value A. When a negative determination is made at step S30, the control flow goes back to step S20. When an affirmative determination is made at step S30, step S40 corresponding to function of the failure determining portion 110 is implemented to determine whether the synchronization position Psync has a value equal to or larger than the value of the given position, namely, whether the synchronization position Psync is located in the given position or located on the engaging side of the given position. When a negative determination is made at step S40, the control flow goes back to step S20. When an affirmative determination is made at step S40, step S50 corresponding to function of the failure determining portion 110 is implemented to determine whether the state in which the affirmative determination is made at step S40 has continued for at least the given length A of time. When a negative determination is made at step S50, the control flow goes back to step S20. When an affirmative determination is made at step S50, step S60 corresponding to function of the failure determining portion 110 is implemented to set the balk-failure determining flag to "ON". Step S60 is followed by step S70 corresponding to functions of the failure determining portion 110 and the clutch control portion 106, which is implemented to determine that there is concern of generation of the gear noise in the dog clutch D1 and stop the execution of the synchronous-engagement process control.

As described above, in the present embodiment, during synchronous-engagement process control, when it is determined the synchronization rotational speed difference ΔNs1 is equal to or larger than the given difference value with the synchronization position Psync being located on the engaging side of the synchronizing position, namely, when it is determined that there is a possibility that the gear noise would occur in the dog clutch D1, the execution of the synchronous-engagement process control is stopped and the synchromesh mechanism S1 or the hydraulic actuator 57 is operated to place the dog clutch D1 back into the released state. Thus, the execution of the synchronous-engagement process control can be avoided from being proceeded in a state with concern of generation of the gear noise. It is therefore possible to avoid or reduce generation of the gear noise during process of engagement of the dog clutch D1. A reduction of durability of each part of the dog clutch D1 can be avoided or restrained by thus avoiding or reducing the generation of the gear noise.

In the present embodiment, it is determined whether the synchronization position Psync is located on the engaging side of the synchronizing position, depending on whether the synchronization position Psync is located to be distant from the synchronizing position by at least the given distance value α on the engaging side of the synchronizing position, before the synchronization rotational speed difference ΔNs1 becomes zero, so that it is possible to appropriately determine whether there is a possibility that the gear noise occurs in the dog clutch D1. That is, during the synchronous-engagement process control, the state with concern of generation of the gear noise can be appropriately grasped. Thus, the synchronous-engagement process control can be appropriately avoided from being proceeded in the state with concern of generation of the gear noise.

In the present embodiment, it is determined whether the synchronization position Psync is located to be distant from the synchronizing position by at least the given distance value α on the engaging side of the synchronizing position, depending on whether the state in which the synchronization position Psync is located to be distant from the synchronizing position by at least the given distance value α on the engaging side of the synchronizing position, continues for at least the given length of time A. Thus, it is possible to more appropriately determine whether there is a possibility that the gear noise occurs in the dog clutch D1.

There will be described another embodiment of this invention. The same reference signs as used in the above-described first embodiment will be used in the following embodiment, to identify the functionally corresponding elements, and descriptions thereof are not provided.

Second Embodiment

In the description of the above-described first embodiment, the state of the balk failure has been described, by way of example, as a case in which there is a possibility that the gear noise would be caused in the dog clutch D1. However, in addition to the state of the balk failure, also in a state of synchronization lost, there is a possibility that the gear noise could be caused in the dog clutch D1. The synchronization lost state is, for example, a state in which the synchronization rotational speed difference $\Delta$Ns1 has become not smaller than the given difference value again after the synchronization rotational speed difference $\Delta$Ns1 had been made zero temporarily during execution of the synchronous-engagement process control. In this second embodiment, when the synchronization rotational speed difference $\Delta$Ns1 becomes not smaller than the given difference value again after completion of the synchronization, it is determined that the synchronization (that is made by the synchromesh mechanism S1) is lost unintentionally, namely, determined that the synchronization lost is caused. The synchronization lost is caused, for example, in a case in which, after the synchronization is completed by the synchromesh mechanism S1, before the spline teeth 72 provided in the sleeve 56 are brought into meshing engagements with the spline teeth 74 provided in the clutch gear 55 by implementation of the pushing step, the synchronous output rotational speed Ns1$o$ is changed by some factors such as sudden stop and running on a poor conditioned road whereby the synchronization rotational speed difference $\Delta$Ns1 is made not smaller than the given difference value.

The failure determining portion 110 determines whether the rotational speed difference $\Delta$Ns1 is equal to or larger than a given difference value with the synchronization position Psync being located on the engaging side of the synchronizing position, depending on whether the rotational speed difference $\Delta$Ns1 has become equal to or larger than the given difference value after the rotational speed difference $\Delta$Ns1 had become zero temporarily.

The failure determining portion 110 determines whether the synchronization rotational speed difference $\Delta$Ns1 had been zeroed temporarily, depending on whether there is a history that the synchronization was made completed by the synchromesh mechanism S1, namely, a history that the synchronization rotational speed difference $\Delta$Ns1 was made zero. When the synchronization rotational speed difference $\Delta$Ns1 is zeroed during one cycle of execution of the synchronous-engagement process control, the failure determining portion 110 stores the above-described history. It is noted that the history is cleared when each cycle of execution of the synchronous-engagement process control is completed.

The failure determining portion 110 determines whether the synchronization rotational speed difference $\Delta$Ns1 becomes not smaller than the given difference value, depending on whether the synchronization rotational speed difference $\Delta$Ns1 becomes not smaller than a given difference value B as a first given difference value. Further, the failure determining portion 110 determines whether the synchronization rotational speed difference $\Delta$Ns1 becomes not smaller than the given difference value, depending on whether a state in which the rotational speed difference $\Delta$Ns1 is not smaller than a given difference value C as a second given difference value that is smaller than the first given difference value, continues for at least a given length B of time. The given difference value B is, for example, a predetermined threshold value of the synchronization rotational speed difference $\Delta$Ns1 for immediately determining that the synchronization lost is caused. Each of the given difference value C and given length B of time is a predetermined threshold value for determining the synchronization lost.

When determining that there is the history that the synchronization was completed by the synchromesh mechanism S1, if determining that synchronization rotational speed difference $\Delta$Ns1 has become not smaller than the given difference value B or if determining that the state in which the rotational speed difference $\Delta$Ns1 is not smaller than the given difference value C has continued for at least the given length B of time, the failure determining portion 110 determines that the synchronization lost is caused, namely, sets a synchronization-lost determining flag to "ON".

Figure 9:
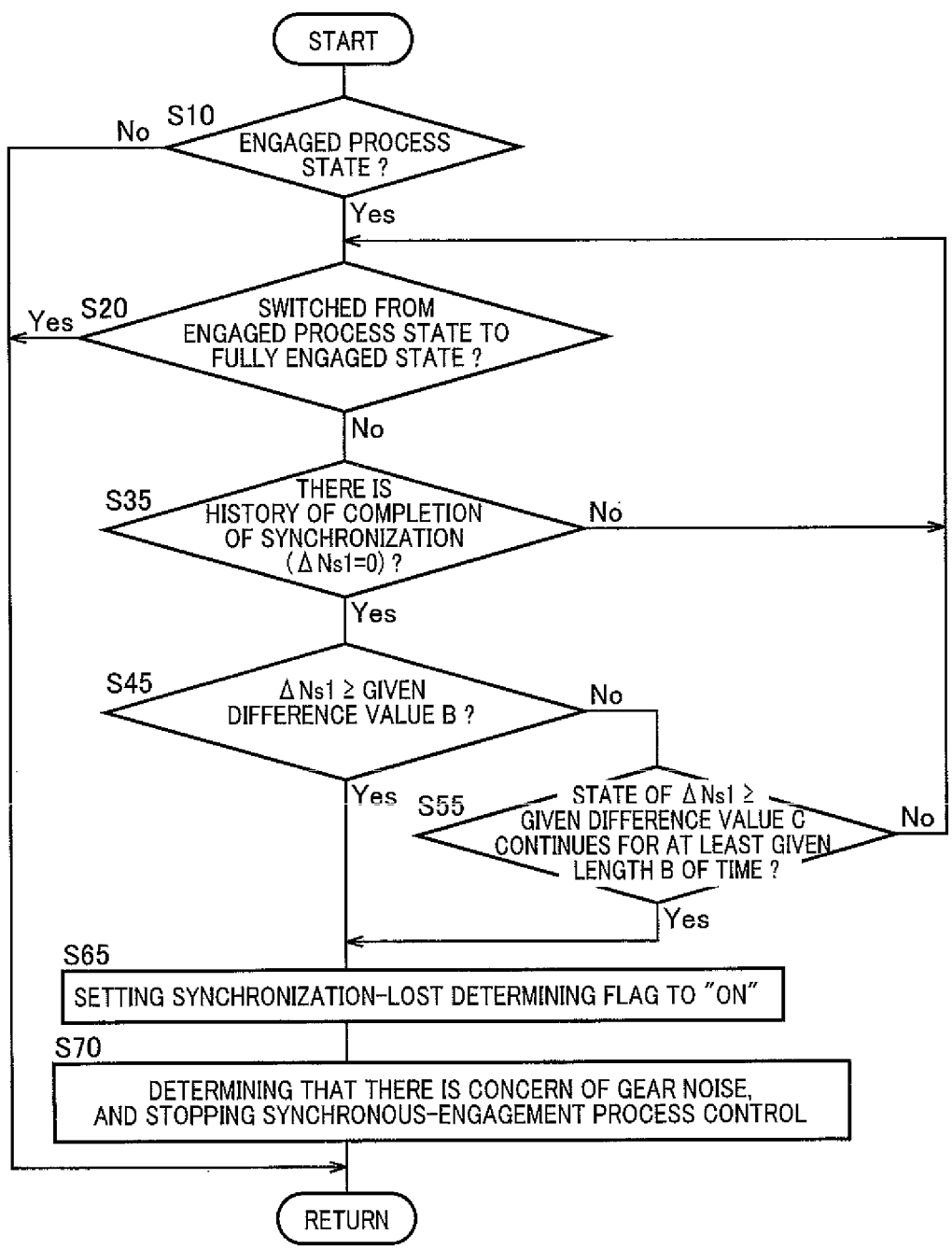
FIG. 9 is a flow chart showing a main part of a control routine executed by the control apparatus, namely, a control routine that is executed for avoiding or reducing generation of a gear noise during process of engagement of the dog clutch, wherein the control routine is according to a second embodiment of the invention.

FIG. 9 is a flow chart showing a main part of a control routine executed by the electronic control apparatus 100, namely, a control routine that is executed for avoiding or reducing generation of the gear noise during process of engagement of the dog clutch D1. The control routine is executed, for example, in a repeated manner.

As shown in FIG. 9, the control routine is initiated with step S10 corresponding to function of the state determining portion 108, which is implemented to determine whether the operation state of the dog clutch D1 is the engaged process state. When a negative determination is made at step S10, one cycle of execution of the control routine is completed. When an affirmative determination is made at step S10, step S20 corresponding to function of the state determining portion 108 is implemented to determine whether the operation state of the dog clutch D1 has been switched from the engaged process state to the fully engaged state. When an affirmative determination is made at step S20, one cycle of execution of the control routine is completed. When a negative determination is made at step S20, step S35 corresponding to function of the failure determining portion 110 is implemented to determine whether there is the history that the synchronization had been completed by the synchromesh mechanism S1, namely, the history that the synchronization rotational speed difference $\Delta$Ns1 had become zero. When a negative determination is made at step S35, the control flow goes back to step S20. When an affirmative determination is made at step S35, step S45 corresponding to function of the failure determining portion 110 is implemented to determine whether the synchronization rotational speed difference $\Delta$Ns1 is equal to or larger than the given difference value B. When a negative determination is made at step S45, step S55 corresponding to function of the failure determining portion 110 is implemented to determine whether a state in which the synchronization rotational speed difference $\Delta$Ns1 is equal to or larger than the given difference value C has continued for at least the given length B of time. When a negative determination is made at step S55, the control flow goes back to step S20. When an affirmative determination is made at step S45 or at step S55, step S65 corresponding to function of the failure determining portion 110 is implemented to set the synchronization-lost determining flag to "ON". Step S65 is followed by step S70 corresponding to functions of the failure determining portion 110 and the clutch control portion 106, which is implemented to determine that there is concern of generation of the gear noise in the dog clutch D1 and stop the execution of the synchronous-engagement process control.

As described above, as in the above-described first embodiment, in the second embodiment, it is possible to avoid or reduce generation of the gear noise during process of engagement of the dog clutch D1.

In the present second embodiment, it is determined whether the synchronization rotational speed difference ΔNs1 is equal to or larger than the given difference value, depending on whether the synchronization rotational speed difference ΔNs1 becomes equal to or larger than the given difference value after the synchronization rotational speed difference ΔNs1 temporarily becomes zero. Thus, it is possible to appropriately determine whether there is a possibility that the gear noise occurs in the dog clutch D1. Therefore, the synchronous-engagement process control can be appropriately avoided from being proceeded in the state with concern of generation of the gear noise.

In the present second embodiment, it is determined whether the synchronization rotational speed difference ΔNs1 is equal to or larger than the given difference value, depending on whether the synchronization rotational speed difference ΔNs1 is equal to or larger than the first given difference value B or depending whether the state in which the synchronization rotational speed difference ΔNs1 is equal to or larger than the second given difference value C, continues for at least the given length B of time. Thus, it is possible to more appropriately determine whether there is a possibility that the gear noise occurs in the dog clutch D1.

While the preferred embodiments of this invention have been described in detail by reference to the drawings, it is to be understood that the invention may be otherwise embodied.

For example, the control flow of the first embodiment shown in the FIG. 8 and the control flow of the second embodiment shown in FIG. 9 may be executed concurrently with each other. In this modified arrangement, the synchronous-engagement process control is suspended when the balk-failure determining flag is set to "ON" or when the synchronization-lost determining flag is set to "ON".

In the first embodiment, the failure determining portion 110 determines that the balk failure occurs when determining that the state in which the value of the synchronization position Psync is not smaller than the value of the synchronization position Psync with the synchronization rotational speed difference ΔNs1 being not smaller than the given difference value A, has continued for at least the given length A of time. However, this arrangement is not essential. For example, the failure determining portion 110 may determine that the balk failure occurs when determining that the value of the synchronization position Psync becomes not smaller than a given position value before the synchronization rotational speed difference ΔNs1 (that is reduced during the execution of the synchronous-engagement process control) becomes zero.

In the above-described second embodiment, the failure determining portion 110 determines that the synchronization lost occurs when determining that there is the history that the synchronization had been completed by the synchromesh mechanism S1 and that the synchronization rotational speed difference ΔNs1 has become not smaller than the given difference value B or when determining that there is the history that the synchronization had been completed by the synchromesh mechanism S1 and that the synchronization rotational speed difference ΔNs1 has been not smaller than the given difference value C for at least the given length B of time. However, this arrangement is not essential. For example, the failure determining portion 110 may determine that the synchronization lost occurs when determining that the synchronization rotational speed difference ΔNs1 (that is reduced during the execution of the synchronous-engagement process control) becomes not smaller than a given difference value after the synchronization rotational speed difference ΔNs1 has temporarily become zero.

In the above-described embodiments, the present invention is applied to the vehicle 10 having the first and second drive-force transmitting paths PT1, PT2 that are provided in parallel with each other between the input shaft 22 and the output shaft 30, such that the drive force is transmittable by the gear mechanism 28 through the first drive-force transmitting path PT1, and such that the drive force is transmittable by the continuously-variable transmission mechanism 24 through the second drive-force transmitting path PT2. However, the present invention is applicable also to a drive-force transmitting apparatus having a synchronous meshing parallel two-axes type manual automatic transmission capable of automatically switching the operation state of the dog clutch, for example. The present invention is applicable to any vehicle drive-force transmitting apparatus including a dog clutch which is provided with a synchromesh mechanism and which is to be operated by an actuator.

In the above-described embodiments, the execution of the synchronous-engagement process control is stopped when there is concern of generation of the gear noise. It might be possible to employ an arrangement in which the execution of the synchronous-engagement process control is stopped after the generation of the gear noise started. In such an arrangement, it might be possible to determine the generation of the gear noise, by detecting change or fluctuation of a rotational speed such as the synchronous input rotational speed Ns1$i$ and the synchronous output rotational speed Ns1$o$, because the rotational speed is changed or fluctuated upon the generation of the gear noise. However, it would be an issue how the fluctuation of the rotational speed caused by the generation of the gear noise could be distinguished from fluctuation of the rotational speed caused by other factors such as running on a poor-conditioned road. Further, since generation of the gear noise causes a particular behavior such as fluctuation of the synchronization position Psync (i.e., the position of the sleeve 56), it might be possible to stop the execution of the synchronous-engagement process control when the generation of the gear noise is determined based on detection of the fluctuation of the synchronization position Psync. However, it would be an issue how the fluctuation of the synchronization position Psync caused by the generation of the gear noise could be distinguished from minute fluctuation of the synchronization position Psync in normality during execution of the synchronous-engagement process control, which could be caused by, for example, change or fluctuation of an actual value of the synchronization control pressure Ps1. Further, since generation of the gear noise causes also an actual value of the synchronization control pressure Ps1 resulting from the fluctuation of the synchronization position Psync, it might be possible to stop the execution of the synchronous-engagement process control when the generation of the gear noise is determined based on detection of the fluctuation of the actual value of the synchronization control pressure Ps1. However, it would be an issue how the fluctuation of the actual value of the synchronization control pressure Ps1 caused by the generation of the gear noise could be distinguished from minute fluctuation of the actual value of the synchronization control pressure Ps1 which could be caused in normality during execution of the synchronous-engagement process control. Moreover, a sensor would be required to detect the fluctuation of the actual value of the synchronization control pressure Ps1. Further, it might be possible to detect sounds or noises upon generation of the gear noise, and to stop the execution of the synchronous-engagement process control when the generation of the gear noise is determined based on detection of the sounds or noise. However, a sensor would be required to detect the sounds or noises upon generation of the gear noise. In any of these arrangements, since countermeasure is taken after start of generation of the gear noise, there is concern how much the reduction of durability of each part of the dog clutch D1 can be restrained. On the other hand, in the present invention, the above issues or problems do not exist.

In the above-described embodiments, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiments, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or a gear ratio that is higher than the highest gear ratio γmax of the continuously-variable transmission mechanism 24.

In the above-described embodiments, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiments, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided in the vehicle 10.

It is to be understood that the embodiments described above are given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
56: sleeve
57: hydraulic actuator
60: primary pulley
64: secondary pulley
66: transmission belt (transfer element)
100: electronic control apparatus (control apparatus)
106: clutch control portion
110: failure determining portion
C1: first clutch (first friction engagement device)
C2: second clutch (second friction engagement device)
B1: first brake (first friction engagement device)
D1: dog clutch
S1: synchromesh mechanism
PT1: first drive-force transmitting path
PT2: second drive-force transmitting path

What is claimed is:

1. A control apparatus for a drive-force transmitting apparatus that is to be provided in a vehicle having a drive force source and drive wheels; the drive-force transmitting apparatus including a dog clutch which is provided with a synchromesh mechanism and which is to be operated by an actuator to selectively connect and disconnect a drive-force transmitting path between the drive force source and the drive wheels; the dog clutch including a sleeve that is to be moved by the actuator so as to switch an operation state of the dog clutch between an engaged state in which the drive-force transmitting path is connected and a released state in which the drive-force transmitting path is disconnected, such that a rotational speed difference between an input-side rotational speed and an output-side rotational speed of the dog clutch is to be zeroed when the sleeve is positioned in a synchronizing position in process of switching of the dog clutch from the released state to the engaged state; the control apparatus comprising:
a processor programmed to function as:
a failure determining portion configured, in the process of the switching of the dog clutch from the released state to the engaged state, to determine whether the rotational speed difference is equal to or larger than a given difference value when the sleeve is positioned on an engaging side of the synchronizing position for placing the dog clutch into the engaged state, and
a clutch control portion configured, upon execution of control for operating the actuator for the switching of the dog clutch from the released state to the engaged state, to stop the switching of the dog clutch from the released state to the engaged state and to cause the actuator to place the dog clutch back into the released state, when the failure determining portion determines that the rotational speed difference is equal to or larger than the given difference value with the sleeve being positioned on the engaging side of the synchronizing position, wherein:
the failure determining portion is configured to determine whether the sleeve is positioned on the engaging side of the synchronizing position, depending on whether the sleeve is positioned to be distant from the synchronizing position by at least a given distance value on the engaging side of the synchronizing position, before the rotational speed difference becomes zero, and
the failure determining portion is configured to determine whether the sleeve is positioned to be distant from the synchronizing position by at least the given distance value on the engaging side of the synchronizing position, depending on whether a state in which the sleeve is positioned to be distant from the synchronizing position by at least the given distance value on the engaging side of the synchronizing position, continues for at least a given length of time.

2. The control apparatus according to claim 1,
wherein the drive-force transmitting apparatus further includes: an input rotary member to which the drive force is to be transmitted from the drive force source; an output rotary member from which the drive force is to be outputted to the drive wheels; a gear mechanism configured to provide at least one gear ratio; a continuously-variable transmission mechanism including a primary pulley, a secondary pulley and a transfer element looped over the primary and secondary pulleys; and first and second frictional engagement devices,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path that corresponds to the drive-force transmitting path, such that the drive force is transmitted by the gear mechanism through the first drive-force transmitting path when the first drive-force transmitting path is established by engagements of the first frictional engagement device and the dog clutch, and
wherein the plurality of drive-force transmitting paths include a second drive-force transmitting path, such that the drive force is transmitted by the continuously-variable transmission mechanism through the second drive-force transmitting path when the second drive-force transmitting path is established by engagement of the second frictional engagement device.

3. The control apparatus according to claim 1,
wherein the failure determining portion is configured, when determining that the rotational speed difference is equal to or larger than the given difference value with the sleeve being positioned on the engaging side of the synchronizing position in the process of the switching of the dog clutch from the released state to the engaged state, to determine that there is a possibility that a gear noise occurs in the dog clutch, and
wherein the clutch control portion is configured, upon execution of the control for operating the actuator for the switching of the dog clutch from the released state to the engaged state, to stop the switching of the dog clutch from the released state to the engaged state and to cause the actuator to place the dog clutch back into the released state, when the failure determining portion determines that there is the possibility that the gear noise occurs in the dog clutch.

4. The control apparatus according to claim 1,
wherein the dog clutch further includes an input-side rotary member that is to be rotated at the input-side rotational speed and an output-side rotary member that is to be rotated at the output-side rotational speed,
wherein the sleeve is fitted with one of the input-side rotary member and the output-side rotary member, such that the sleeve is unrotatable and movable in an axial direction of the one of the input-side rotary member and the output-side rotary member, relative to the one of the input-side rotary member and the output-side rotary member, and
wherein the sleeve has spline teeth which are provided in an circumferential surface of the sleeve, and which are to be brought into meshing engagements with spline teeth provided in a circumferential surface of the other of the input-side rotary member and the output-side rotary member by movement of the sleeve in a direction away from a releasing side of the synchronizing position that is opposite to the engaging side of the synchronizing position in the axial direction in the process of the switching of the dog clutch from the released state to the engaged state.

5. The control apparatus according to claim 4,
wherein the dog clutch further includes an annular member which is substantially coaxial with the other of the input-side rotary member and the output-side rotary member and which is rotatable together with the sleeve,
wherein the annular member has a tapered circumferential surface that is to be fitted with a tapered circumferential surface of the other of the input-side rotary member and the output-side rotary member, and
wherein, in the process of the switching of the dog clutch from the released state to the engaged state, the annular member is to be pressed against the other of the input-side rotary member and the output-side rotary member by the movement of the sleeve in the direction away from the releasing side of the synchronizing position, for thereby causing the rotational speed difference to be reduced by a friction generated between the tapered circumferential surface of the annular member and the tapered circumferential surface of the other of the input-side rotary member and the output-side rotary member.

6. A control apparatus for a drive-force transmitting apparatus that is to be provided in a vehicle having a drive force source and drive wheels; the drive-force transmitting apparatus including a dog clutch which is provided with a synchromesh mechanism and which is to be operated by an actuator to selectively connect and disconnect a drive-force transmitting path between the drive force source and the drive wheels; the dog clutch including a sleeve that is to be moved by the actuator so as to switch an operation state of the dog clutch between an engaged state in which the drive-force transmitting path is connected and a released state in which the drive-force transmitting path is disconnected, such that a rotational speed difference between an input-side rotational speed and an output-side rotational speed of the dog clutch is to be zeroed when the sleeve is positioned in a synchronizing position in process of switching of the dog clutch from the released state to the engaged state; the control apparatus comprising:
a processor programmed to function as:
a failure determining portion configured, in the process of the switching of the dog clutch from the released state to the engaged state, to determine whether the rotational speed difference is equal to or larger than a given difference value when the sleeve is positioned on an engaging side of the synchronizing position for placing the dog clutch into the engaged state, and
a clutch control portion configured, upon execution of control for operating the actuator for the switching of the dog clutch from the released state to the engaged state, to stop the switching of the dog clutch from the released state to the engaged state and to cause the actuator to place the dog clutch back into the released state, when the failure determining portion determines that the rotational speed difference is equal to or larger than the given difference value with the sleeve being positioned on the engaging side of the synchronizing position, wherein:

the failure determining portion is configured to determine whether the rotational speed difference is equal to or larger than the given difference value, depending on whether the rotational speed difference becomes equal to or larger than the given difference value after the rotational speed difference temporarily becomes zero.

7. The control apparatus according to claim 6, wherein the failure determining portion is configured to determine whether the rotational speed difference is equal to or larger than the given difference value, depending on whether the rotational speed difference is equal to or larger than a first given difference value or depending on whether a state in which the rotational speed difference is equal to or larger than a second given difference value that is smaller than the first given difference value, continues for at least a given length of time.

8. The control apparatus according to claim 6,
wherein the drive-force transmitting apparatus further includes: an input rotary member to which the drive force is to be transmitted from the drive force source; an output rotary member from which the drive force is to be outputted to the drive wheels; a gear mechanism configured to provide at least one gear ratio; a continuously-variable transmission mechanism including a primary pulley, a secondary pulley and a transfer element looped over the primary and secondary pulleys; and first and second frictional engagement devices,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path that corresponds to the drive-force transmitting path, such that the drive force is transmitted by the gear mechanism through the first drive-force transmitting path when the first drive-force transmitting path is established by engagements of the first frictional engagement device and the dog clutch, and
wherein the plurality of drive-force transmitting paths include a second drive-force transmitting path, such that the drive force is transmitted by the continuously-variable transmission mechanism through the second drive-force transmitting path when the second drive-force transmitting path is established by engagement of the second frictional engagement device.

9. The control apparatus according to claim 6,
wherein the failure determining portion is configured, when determining that the rotational speed difference is equal to or larger than the given difference value with the sleeve being positioned on the engaging side of the synchronizing position in the process of the switching of the dog clutch from the released state to the engaged state, to determine that there is a possibility that a gear noise occurs in the dog clutch, and wherein the clutch control portion is configured, upon execution of the control for operating the actuator for the switching of the dog clutch from the released state to the engaged state, to stop the switching of the dog clutch from the released state to the engaged state and to cause the actuator to place the dog clutch back into the released state, when the failure determining portion determines that there is the possibility that the gear noise occurs in the dog clutch.

10. The control apparatus according to claim 6,
wherein the dog clutch further includes an input-side rotary member that is to be rotated at the input-side rotational speed and an output-side rotary member that is to be rotated at the output-side rotational speed,
wherein the sleeve is fitted with one of the input-side rotary member and the output-side rotary member, such that the sleeve is unrotatable and movable in an axial direction of the one of the input-side rotary member and the output-side rotary member, relative to the one of the input-side rotary member and the output-side rotary member, and
wherein the sleeve has spline teeth which are provided in an circumferential surface of the sleeve, and which are to be brought into meshing engagements with spline teeth provided in a circumferential surface of the other of the input-side rotary member and the output-side rotary member by movement of the sleeve in a direction away from a releasing side of the synchronizing position that is opposite to the engaging side of the synchronizing position in the axial direction in the process of the switching of the dog clutch from the released state to the engaged state.

11. The control apparatus according to claim 10,
wherein the dog clutch further includes an annular member which is substantially coaxial with the other of the input-side rotary member and the output-side rotary member and which is rotatable together with the sleeve,
wherein the annular member has a tapered circumferential surface that is to be fitted with a tapered circumferential surface of the other of the input-side rotary member and the output-side rotary member, and
wherein, in the process of the switching of the dog clutch from the released state to the engaged state, the annular member is to be pressed against the other of the input-side rotary member and the output-side rotary member by the movement of the sleeve in the direction away from the releasing side of the synchronizing position, for thereby causing the rotational speed difference to be reduced by a friction generated between the tapered circumferential surface of the annular member and the tapered circumferential surface of the other of the input-side rotary member and the output-side rotary member.

* * * * *